US007714912B2

(12) United States Patent
Faisman et al.

(10) Patent No.: US 7,714,912 B2
(45) Date of Patent: May 11, 2010

(54) INTELLIGENT MIRROR

(75) Inventors: Alexander Faisman, Croton-on-Hudson, NY (US); Genady Grabarnik, Scarsdale, NY (US); David Nahamoo, Great Neck, NY (US); Apostol Ivanov Natsev, Harrison, NY (US); Ganesh N. Ramaswamy, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 11/626,406

(22) Filed: Jan. 24, 2007

(65) Prior Publication Data

US 2008/0174682 A1 Jul. 24, 2008

(51) Int. Cl.
*H04N 5/262* (2006.01)
*G09B 25/00* (2006.01)
*G06F 17/30* (2006.01)
*G09G 5/00* (2006.01)

(52) U.S. Cl. .................. 348/239; 434/395; 705/27; 345/633

(58) Field of Classification Search ........... 348/239; 434/395; 705/27; 345/630, 633; 700/130, 700/135
See application file for complete search history.

(56) References Cited

U.S. PATENT DOCUMENTS

| | | | | |
|---|---|---|---|---|
| 6,307,568 B1 * | 10/2001 | Rom | ........................ | 345/629 |
| 6,473,671 B1 * | 10/2002 | Yan | ........................ | 700/134 |
| 6,546,309 B1 * | 4/2003 | Gazzuolo | ........................ | 700/132 |
| 6,633,289 B1 * | 10/2003 | Lotens et al. | ........................ | 345/419 |
| 6,661,433 B1 * | 12/2003 | Lee | ........................ | 715/764 |
| 6,842,172 B2 * | 1/2005 | Kobayashi | ........................ | 345/419 |
| 6,901,379 B1 * | 5/2005 | Balter et al. | ........................ | 705/27 |
| 6,903,756 B1 * | 6/2005 | Giannini | ........................ | 715/747 |
| 7,027,847 B2 * | 4/2006 | Kawasaki et al. | ........................ | 455/702 |
| 7,072,847 B2 * | 7/2006 | Ulenas et al. | ........................ | 705/10 |
| 7,089,216 B2 * | 8/2006 | Van Overveld | ........................ | 706/12 |
| 7,194,327 B2 * | 3/2007 | Lam | ........................ | 700/132 |
| 7,328,119 B1 * | 2/2008 | Pryor et al. | ........................ | 702/127 |
| 7,346,561 B1 * | 3/2008 | Devitt et al. | ........................ | 705/27 |
| 7,398,231 B2 * | 7/2008 | Wan et al. | ........................ | 705/26 |
| 7,617,016 B2 * | 11/2009 | Wannier et al. | ........................ | 700/132 |
| 2002/0133432 A1 * | 9/2002 | Yamashita | ........................ | 705/27 |
| 2002/0178061 A1 * | 11/2002 | Lam | ........................ | 705/14 |
| 2003/0101105 A1 * | 5/2003 | Vock | ........................ | 705/27 |
| 2004/0083142 A1 * | 4/2004 | Kozzinn | ........................ | 705/27 |

(Continued)

OTHER PUBLICATIONS

PC World: "New Philips TVs Sport Mirrors, Halos: Light-sensitive LCDs, keychain camcorder, and home theater highlight CES announcments." Ramon G. Macleod, PC World (http://www.pcworld.com/news/article/0,aid,114225,00.asp).

(Continued)

*Primary Examiner*—David L Ometz
*Assistant Examiner*—Dillon Durnford-Geszvain
(74) *Attorney, Agent, or Firm*—McGinn IP Law Group PLLC; Anne V. Dougherty, Esq.

(57) ABSTRACT

An intelligent imaging system, includes an image generator that projects multiple angle views of a user, a plurality of cameras for capturing a plurality of images of the user, an image processing unit, a style advisor, and a control mechanism.

2 Claims, 3 Drawing Sheets

U.S. PATENT DOCUMENTS

2005/0131776 A1* 6/2005 Perotti et al. .................. 705/27
2005/0251463 A1* 11/2005 Nagai et al. ................... 705/27
2006/0100938 A1* 5/2006 Fukuma et al. ............... 705/27
2006/0184993 A1* 8/2006 Goldthwaite et al. ........ 725/135
2008/0235114 A1* 9/2008 Wannier et al. ............... 705/27

OTHER PUBLICATIONS

Gizmag: "Intelligent mirror shows what you will look like in 5, 10, 20 years" (http://www.gizmag.com/go/3691).

* cited by examiner 100
100
FIG. 2A
FIG. 2B

INTELLIGENT MIRROR

BACKGROUND OF THE INVENTION

1. Field of the Invention

The present invention relates to a method and apparatus for viewing oneself from multiple angles. In particular, the present invention describes an intelligent mirror that allows users to project their image from multiple viewing angles.

2. Description of the Related Art

There are many situations where people would like to know how they look from different angles. For instance, people in fitting rooms, hair salons, dressing salons and home bathrooms, often desire multiple angle views of themselves.

Conventionally, to provide multiple views of a person in, for example, a fitting room, multiple mirrors are used. Using multiple mirrors, however, is not practical for home applications. Additionally, the use of multiple mirrors increases the cost, in comparison with using a single mirror.

In addition to viewing oneself from multiple angles, it would also be desirable to visualize how one would look with a certain hair style or outfit.

Typically, people would have to try on several outfits one-at-a-time or have their hair repeatedly styled to visualize themselves with a different hair style or outfit. Repeatedly changing one's outfit or hairstyle wastes considerable time.

Finally, it would be desirable for people to be able to read e-mails, news reports, stock quotes, etc., while they are shaving, combing their hair, brushing their teeth, etc.

Currently, people must wait until they are finished grooming to manually look-up information. Again, this wastes considerable time.

SUMMARY OF THE INVENTION

In view of the foregoing and other exemplary problems, drawbacks, and disadvantages of the conventional methods and structures, an exemplary feature of the present invention is to provide a method and system for projecting a person's image from multiple view angles.

In a first aspect of the present invention, an intelligent imaging system, including an image generator that projects multiple angle views of a user, the image generator comprising a plurality of projectors for projecting an image onto a mirror, a plurality of cameras for capturing a plurality of images of the user, each of the plurality of cameras capturing an image from a different viewing angle of the user, an image processing unit including an image composer, the image composer receives the plurality of images from each of the plurality of cameras, and an image analyzer, the analyzer receiving image information from the image composer, wherein the image processing unit detects a person's features, based on image processing, statistical machine learning and concept detection, detects outfit colors, outfit patterns and outfit composition, based on background subtraction, person tracking and segmentation, and applies virtual modifications to the images using image processing and texture mapping, a style advisor, wherein the style advisor models styles, tracks seasonal style changes and updates models from external sources, registers detected user outfits, accessories and style preferences, and recommends outfits based on personal features or preferences, usage patterns, weather patterns and time of day, and a control mechanism, wherein the control mechanism changes a point of view of the images, chooses which images from which cameras to display, and increases and decreases a size of the images by zooming the images.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIGS. 2A and 2B illustrate an intelligent mirror 100 using the system of the present invention.

DETAILED DESCRIPTION OF EXEMPLARY EMBODIMENTS OF THE INVENTION

Figure 1:
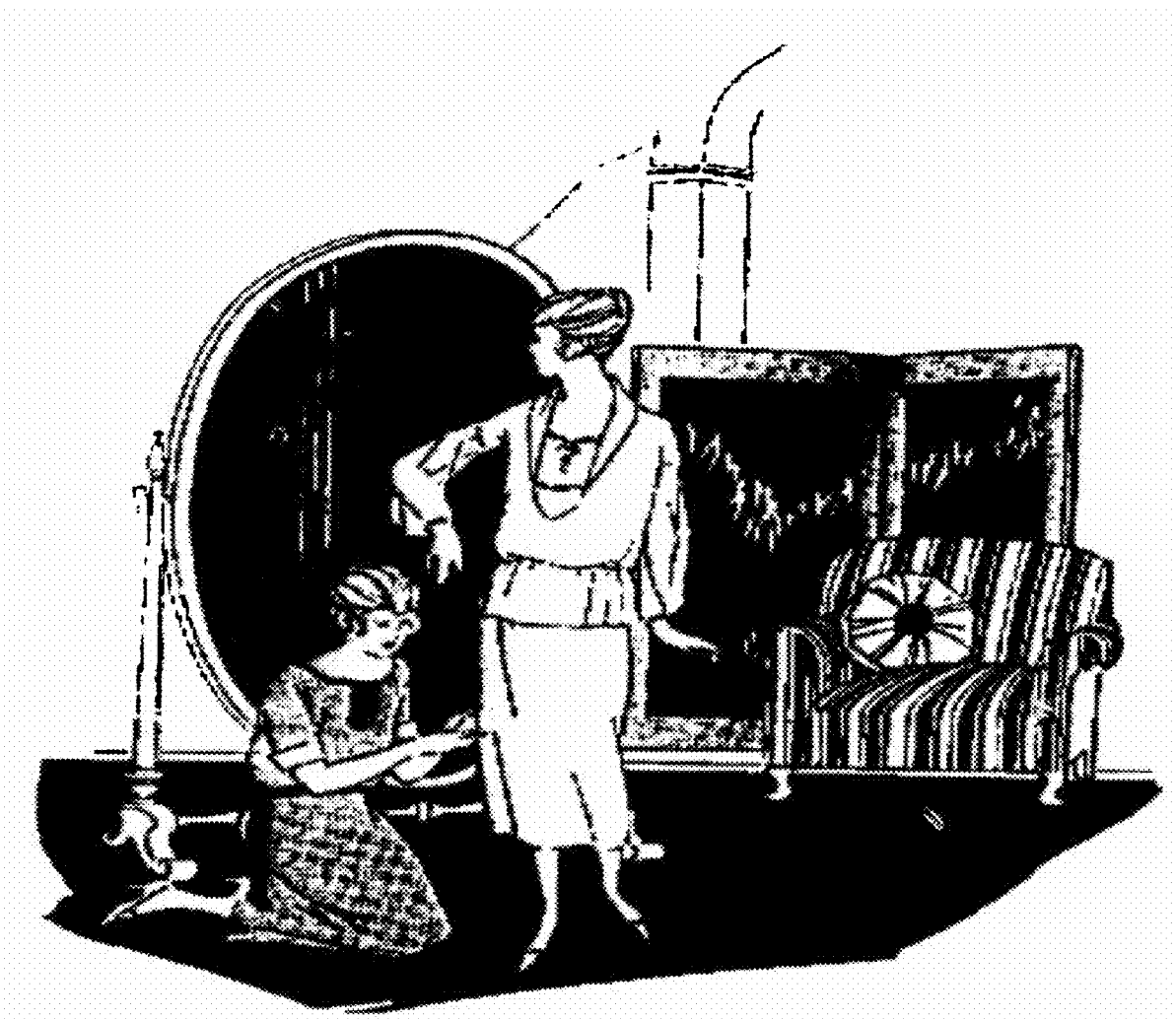
FIG. 1 illustrates a conventional fitting room with a conventional mirror.
Figure 3:
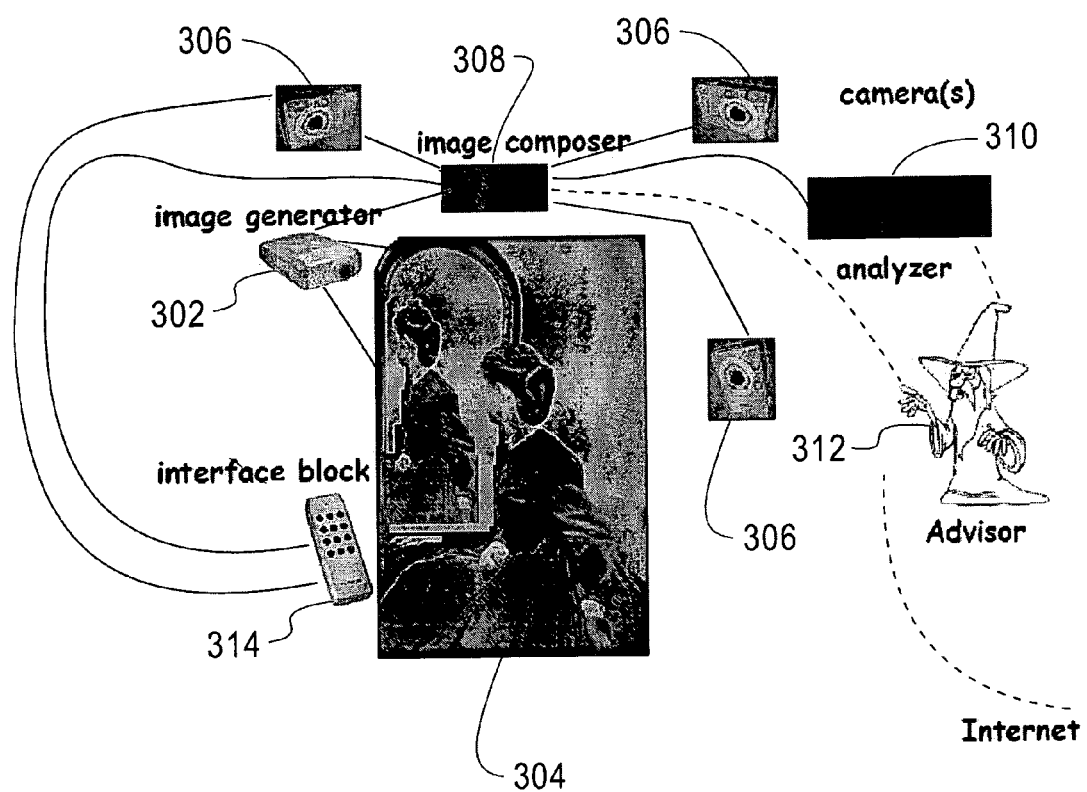
FIG. 3 illustrates an image projection system 300 in accordance with an exemplary aspect of the present invention.

Referring now to the drawings, and more particularly to FIGS. 1-3, there are shown exemplary embodiments of the method and structures according to the present invention.

The present invention is directed to a system for projecting a person's image from multiple view angles. The system may optionally include an interface to control the view angles and zoom settings.

Additionally, the system may modify the projected image of the person using superimposing synthetic maps to superimpose new hair styles or clothing outfits onto the image of the person.

Furthermore, the system may optionally generate advisory information (e.g., e-mail, news, Internet, weather, stocks, etc.) for the user based on analysis of visual and external information.

The system may be packaged in a mirror form with one or more integrated active displays, speakers and microphones.

FIG. 1 illustrates a conventional fitting room with a conventional mirror. Using the conventional mirror, a user cannot view multiple viewing angles. Accordingly, it is difficult for the user to know how the user looks from different angles.

FIGS. 2A and 2B illustrate an intelligent mirror 100 using the system of the present invention. As shown in FIG. 2A, the mirror 100 projects an image of the user's face, while the user is facing the mirror 100. In FIG. 2B, the mirror 100 projects an image of the user from a different viewing angle (e.g., in FIG. 2B the mirror 100 projects a rear image of the user), without having the user change the user's position.

FIG. 3 illustrates an image projection system 300 in accordance with an exemplary aspect of the present invention.

The system 300 includes an image generator 302 that projects multiple angle views of the user. In accordance with the exemplary embodiment illustrated in FIG. 3, the image generator 302 includes one or more projectors for projecting an image onto a wall or a screen.

In an alternative embodiment of the present invention, the image generator 302 includes one or more monitors for displaying images of the user.

In accordance with certain exemplary embodiments of the present invention, the projector 302 projects the images onto a mirror 304. In the embodiment illustrated in FIG. 3, the system 300 includes a single projector 302. The system 300, however, may include a plurality of projectors/monitors 302.

The system 300 also includes a plurality of cameras 306 for capturing images of the user. Each camera 306 captures an image from a different viewing angle of the user.

The system 300 also includes an image processing unit. The image processing unit includes an image composer 308 and an image analyzer 310. The image composer 308 receives images from each of the cameras 306 and transmits image information to the analyzer 310.

The analyzer 310 (image processing unit) detects a person's features (e.g., skin tone, hair, face, eyes, etc.). The features are detected based on image processing, statistical machine learning and concept detection. Furthermore, the image processing unit detects outfit colors, outfit patterns and outfit composition. The outfit features are detected based on background subtraction, person tracking and segmentation.

Finally, the image processing unit may apply virtual modifications to the image such as, for example, hair style, makeup, facial hair grooming and outfit and/or accessory changes. The modifications are made using image processing and texture mapping.

The system 300 may include a style advisor 312. The style advisor 312 models styles, such as matching colors or patterns, etc. The style advisor 312 also tracks seasonal style changes and updates models from external sources (e.g., the internet). Additionally, the style advisor 312 registers all detected user outfits, accessories and style preferences. Finally, the style advisory 312 recommends outfits based on personal features or preferences, usage patterns, weather patterns, time of day, etc.

In addition to style changes, the system may also provide information regarding weather, stocks, sports and other news updates from external sources (e.g., the internet). Furthermore, the system allows a user to access email accounts on the mirror (or other projected surface).

Finally, the system 300 may include an interface block (control mechanism) 314, such as a small wireless device. The control mechanism 314 allows the user to change the point of view of the image, choose which images from which cameras to display, or increase/decrease the size of the image by zooming in/zooming out of the picture.

In a simplest form, the system of the present invention includes a camera and a projector (or screen). The system projects an image taken by the camera on a wall or a screen.

In accordance with another, slightly more involved, aspect of the present invention, the system includes a moving camera or a plurality of cameras and a controlling mechanism (such as a smaller wireless device).

A more complicated system may include moving or fixed cameras, a controlling mechanism and a processing unit.

The method and system of the present invention improves user experience and self-confidence. Furthermore, the present invention saves time and increases productivity.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. An intelligent imaging system, comprising:
   an image generator that projects multiple angle views of a user, said image generator comprising a plurality of projectors for projecting an image onto a mirror or display surface;
   a plurality of cameras, mirrors and projectors for capturing a plurality of images of the user, each of said plurality of cameras capturing an image from a different viewing angle of the user;
   an image processing unit comprising:
       an image composer, said image composer receives said plurality of images from each of said plurality of cameras; and
       an image analyzer, said analyzer receiving image information from said image composer,
       wherein said image processing unit detects a person's features, including the person's face, body and clothing, based on image processing, statistical machine learning and concept detection, detects outfit colors, outfit patterns and outfit composition, based on background subtraction, person tracking and segmentation, and applies virtual modifications to the images using image processing technology to combine images from different view angles and to superimpose additional visual information including different hair styles and clothing outfits;
   a style advisor, wherein said style advisor models clothing styles, generates advisory information for the user based on analysis of visual and external information including body type, fashion trends, real-time weather reports, user's usage patterns, and user's preferences, tracks seasonal style changes and updates models from external sources, registers detected user outfits, accessories and style preferences, and recommends outfits based on personal features or preferences, usage patterns, weather patterns and time of day; and
   a control mechanism, wherein said control mechanism changes a point of view of the images, chooses which images from which cameras to display, and increases and decreases a size of the images by zooming the images.

2. The system according to claim 1, wherein the style advisor further provides information regarding weather, stocks, sports and other news updates from said external sources.

* * * * *